United States Patent [19]
Shalaby et al.

[11] Patent Number: 6,034,198
[45] Date of Patent: Mar. 7, 2000

[54] MODIFIED SOY PROTEIN AND THERMOPLASTIC ARTICLES THEREFROM

[76] Inventors: Shalaby W. Shalaby, P.O. Box 814, Pendleton, S.C. 29670; Alice H. Brandenburg, 1087 Old Clemson Hwy., Seneca, S.C. 29672

[21] Appl. No.: 08/710,203

[22] Filed: Sep. 13, 1996

[51] Int. Cl.⁷ .............................. A23J 1/14; C08H 1/02; H01L 29/76
[52] U.S. Cl. .................. 527/207; 530/378; 264/331.12; 264/331.16; 264/331.18; 264/331.19
[58] Field of Search ......................... 530/378; 527/207; 264/331.12, 331.16, 331.18, 331.19

[56] References Cited

U.S. PATENT DOCUMENTS 3,764,711  10/1973  Melnychyn et al. .................. 426/201

*Primary Examiner*—Nathan M. Nutter

[57] ABSTRACT

The invention relates to a process of chemically modifying soy protein to produce a thermoplastic material. An aqueous alkaline solution of soy protein is mixed with an organic solution of an alkyl or alkenyl succinic anhydride to acylate the protein's amine and hydroxyl groups. The acylated proteins behave as materials capable of forming films with controlled water solubility water vapor permeability. Useful acylating agents include octenyl succinic anhydride (OSA), dodecenyl succinic anhydride (DDSA), and octadecenyl succinic anhydride (ODSA).

15 Claims, 1 Drawing Sheet

THERMAL GRAVIMETRIC ANALYSIS OF ISP AND ALKENYL SUCCINIC ANHYDRIDE MODIFIED ISP FILMS.

DIFFERENTIAL SCANNING CALORIMETRY OF ISP AND ALKENYL SUCCINIC ANHYDRIDE MODIFIED ISP FILMS.

MODIFIED SOY PROTEIN AND THERMOPLASTIC ARTICLES THEREFROM

FIELD OF THE INVENTION

The present invention relates to a new thermoplastic protein composition such as soy protein and a process for achieving the same. The invention further relates to a process for the production of films from chemically modified soy protein.

The present invention further relates to the use of thermoplastic material of chemically modified protein and a plasticizer.

BACKGROUND OF THE INVENTION

In the past 20–25 years there has been much research pertaining to the development of edible films from natural polymers, e.g. protein and carbohydrates. These films may be used as a coating to protect foods from the environment. This includes the inward migration of oxygen, moisture, and other gases and vapors that may cause deterioration of foods. An edible coating may also prevent loss of moisture, flavors, aromas, and other food constituents to the environment due to outward migration from the food. Edible films may also be used within a food to prevent migration of substances between food components.

Edible films have been produced for centuries. They date to ancient China where large vats of soy milk were heated until a skin layer formed on the top. This skin layer was removed and dried to form a film which was later filled with food and formed into shapes.

Food coatings that used waxes and gelatin were patented in the 1800s. Edible films are used today in many applications. Fruits and vegetables are generally coated with waxes and sucrose fatty acid esters/cellulose derivatives. Meats (sausages and hams) are shaped via edible films produced from collagen. Frozen meats are kept in good quality with calcium alginate films. Waxes are used on cheeses.

These edible films are well-suited for their particular applications; however there are other applications where the use of edible films would be advantageous. The main drawback to their use is their solubility or maceration in water. Protein-based edible films are generally classified as excellent barriers to oxygen. The oxygen permeability of soy films is well below the defined value for a barrier material and is similar to that of polyvinylidene chloride and ethylene-vinyl alcohol films, both well known barriers. Generally, a barrier film must have a maximum permeability of 155 cc·25 $\mu m^2$·day·atm. The oxygen permeability of soy protein films has been found to be 4.1 cc·25 $\mu m/m^2$·day·atm.

One of the major limitations to the usefulness of edible proteins and, in general, cellulose ether-based films is their high permeability to water vapor and loss of mechanical integrity when placed in water. The water vapor permeability of soy protein films is $4.18 \times 10^5$ g·25 $\mu m/m^2$·day·atm. If the film is to be used with foods it must have some stability to water and water vapor. Generally, protein-based films are instable to water because of the chemical nature of proteins. Proteins are composed of amino acids linked together by amide bonds. Amide bonds are highly polar, and as such, bind water. Water acts as a plasticizer, increasing the water vapor permeability along with the permeability of other gases, and eventually disrupts the macrostructure of these films, leading to a reduction in their mechanical properties. By altering the chemical structure of these films to become less polar or more hydrophobic, the water permeability and solubility is decreased. In the past, edible film researchers have used lipids as hydrophobic additives in attempts to reduce the water vapor permeability of protein-based films as well as other natural polymeric films, e.g. cellulose ether-based films. While lipids reduce the water vapor permeability, their use is limited. Protein-lipid based films are two-phase systems due to the separation of the lipid from the protein network. In order to be effective in reducing the water vapor permeability, the lipid side must be exposed the more humid environment of the packaging system. If the protein side were exposed to high or moderate humidities, it would swell and lose mechanical integrity and, as discussed earlier, show a great increase in permeability of all gases and vapors. On the other hand, if the protein side is exposed to very low humidities, it will dry out and crack, greatly increasing permeability.

When fatty acids are used as hydrophobic additives, the fatty acid crystals migrate to the surface and can be physically brushed off, resulting in a much higher water vapor permeability. The best materials for reducing water vapor permeability, paraffin wax and beeswax, have an objectional waxy mouthfeel.

In the commercial arena, "protein plastics" refers specifically to casein plastics. There have been efforts to produce a protein-based plastic that is stable to water. Research was conducted in the early part of the nineteenth century aimed at the development of casein plastics. Resistance to water penetration was attained by post-treatment of a formed product with formaldehyde which produces crosslinks through the basic side groups of the protein molecule. The major limitation to these plastics is their relatively high moisture absorption and dimensional instability. Post-treatment was later avoided by direct molding with chemical additives such as dicyandiamide, hexamethylene-tetramine, furfural, and metallic salts which impart additional crosslinking.

Another way to produce casein plastics is by direct compression molding of acid casein acylated with acetic, propionic, or butyric anhydride. These produce protein plastics with a pronounced reduction in water uptake, but they are subsequently weak and brittle. Protein plastics were also produced with higher fatty acid chlorides ranging from caprylyl to stearoyl. These produced casein plastics that showed a pronounced reduction in water absorption, but again suffered in tensile and flexural strength reduction.

Recently, there has been renewed efforts to produce water resistant films from grafted proteins. U.S. Pat. No. 4,045,239 is directed to a thermoplastic synthetic material formed from a chemically modified protein and chemically reactive additive such as a bisacrlyamide or bismethacrylamide.

U.S. Pat. No. 5,260,396 describes a water resistant film made from grafted proteins, the grafting material being monoethylenically unsaturated monomers.

SUMMARY OF THE INVENTION

Therefore, it is an object of this invention to provide a novel soy protein film that is stable to water and can be formed by conventional thermoplastic film processing.

The present invention provides a process for the production of thermoplastic material of chemically modified soy protein, in which an aqueous alkaline protein solution is mixed with an organic solution of alkenyl succinic anhydrides to form carboxy-acylated derivatives.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF THE INVENTION

Figure 1:
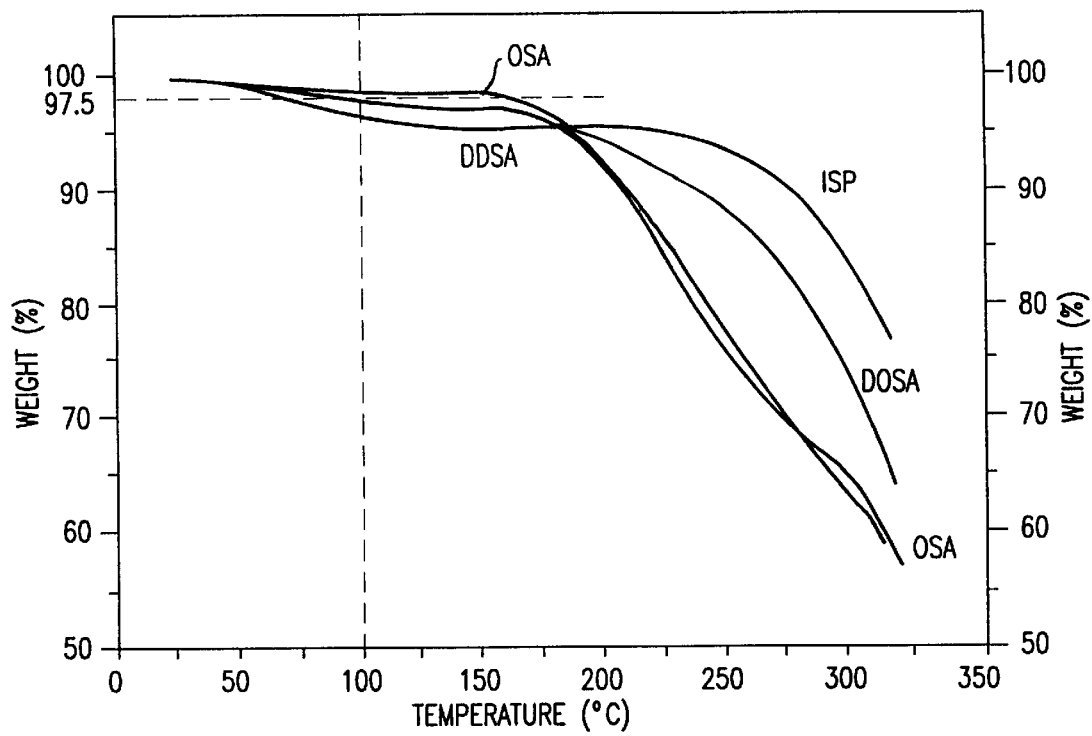
FIG. 1 is a diagrammatic representation of a thermal gravimetric analysis of isolated soy protein and alkenyl succinic anhydride modified isolated soy protein films.

The present invention is generally directed to the acylation of soy protein with higher cyclic anhydrides or alkenyl succinic anhydrides. Films are then formed from the modified soy protein by any of a number of known methods.

Generally, the invention relates to novel acylated soy protein compositions and a process for their formation by reacting the protein with cyclic anhydrides such as succinic or glutaric anhydride, to produce thermally processable materials. Useful forms of the latter include water-insoluble films and sheets for packaging and precursors of water-soluble polyanions. Water-soluble salts of those precursors can be used for sequestering divalent and polyvalent metal ions among other cationic species in rectifiable aqueous media. While succinic or glutaric anhydrides with short chain substituents ($C_1$, $C_2$, etc.) can be used to produce the water-soluble polyanions, long chain substituents ($C_8$ to $C_{26}$) on the succinic or glutaric anhydride are required for the formation of thermally processable water-insoluble materials. Useful acylating agents include 2-methyl and 2-ethyl succinic anhydrides on one hand, and 2-octenyl, 2-dodecenyl, and 2-octadecenyl succinic anhydrides on the other hand for the production of water-soluble and water-insoluble materials, respectively.

The basic process for the present invention entails adding an excess of alkenyl succinic anhydride to an aqueous solution of soy protein at an alkaline pH (7–8), with stirring, for a designated period of time. Prior to acylation, isolated soy protein (ISP) is dissolved in deionized water (5% w/v) and adjusted to pH 8.5 with 1 N sodium hydroxide. This solution is heated to approximately 50° C. to facilitate the reaction. An excess of alkenyl succinic anhydride, relative to the primary amine group of the lysine residues, is dissolved in 100 ml of tetrahydrofuran. The alkenyl succinic anhydride/tetrahydrofuran solution is added to the soy protein solution in small increments over a one hour period. By adding an excess of the alkenyl succinic anhydride in small amounts, there is new, unhydrolyzed alkenyl succinic anhydride available to react with the lysine residues throughout the reaction. The solution is then stirred for an additional hour to allow any unreacted anhydride to either react with the protein or hydrolyze to alkenyl succinic acid. Then the solution is precipitated with hydrochloric acid, rinsed several times to remove hydrolyzed anhydride, and dried.

Generally, films are formed from modified soy protein by two methods, solution casting and compression molding. Octenyl succinic anhydride—(OSA-) and dodecenyl succinic anhydride—(DDSA) modified ISP films were formed by solution casting. Thus, chemically-modified ISP powder is dissolved in a mixture of ammonium hydroxide and water, with glycerol added as the plasticizer, heated to 80° C. for 30 minutes, and cast onto flat plates. OSA- and DDSA-modified ISP films can be made with less plasticizer than films made from ISP. The reduction in plasticizer is significant since the water vapor permeability generally decreases with a decrease in the amount of such plasticizer. Octadecenyl succinic anhydride—(ODSA-) modified ISP films are formed by compression molding the powder between two heated plates. These films can be made without plasticizer. ODSA-modified ISP films exhibited the greatest decrease in water vapor permeability. Water vapor permeability of ODSA-modified ISP films was 32-fold lower than typical ISP films. Octadecenyl succinic anhydride modified ISP films had a thickness of 189 $\mu$m. This was the thinnest films that could be made by compression molding in our laboratory. This thickness is considerably greater than the thickness of OSA- and DDSA-modified ISP films made by casting. It has been noted that for hydrophilic films, as the thickness decreases, the water vapor permeability also decreases. The lipophilic groups orient to the surface and become more effective in increasing the barrier properties as the surface to volume ratio increases. It is believed that ODSA-modified ISP films would have even lower water vapor permeability if they were manufactured at 51 or 25 $\mu$m as the ISP films were.

EXAMPLE 1

OSA-modified Soy Protein

Isolated soy protein (30 g) was dispersed in deionized water. The pH was adjusted to 8.5 with 1 N NaOH and the dispersion was heated to 50° C. Octenyl succinic anhydride (18 g) was dissolved in 100 ml of tetrahydrofuran. When the temperature of the soy dispersion reached 50° C., the OSA/THF solution was added in 5 ml increments over 1 hour with concurrent adjustment of pH to 8.5 with 1 N NaOH. The solution was stirred for an additional hour to hydrolyze any unreacted anhydride. Protein was recovered by precipitation at pH 4.0 with 1 N HCl. The precipitate was washed and filtered three times with deionized water. The protein was dried at 60° C. and finely ground.

EXAMPLE 2

DDSA-modified Soy Protein

Isolated soy protein (30 g) was dispersed in deionized water. The pH was adjusted to 8.5 with 1 N NaOH and the dispersion was heated to 50° C. Dodecenyl succinic anhydride (18 g) was dissolved in 100 ml of tetrahydrofuran. When the temperature of the soy dispersion reached 50° C., the DDSA/THF solution was added in 5 ml increments over 1 hour with concurrent adjustment of pH to 8.5 with 1 N NaOH. The solution was stirred for an additional hour to hydrolyze any unreacted anhydride. Protein was recovered by precipitation at pH 4.0 with 1 N HCl. The precipitate was washed and filtered three times with deionized water. The protein was dried at 60° C. and finely ground.

EXAMPLE 3

ODSA-modified Soy Protein

Isolated soy protein (30 g) was dispersed in deionized water. The pH was adjusted to 8.5 with 1 N NaOH and the dispersion was heated to 50° C. Octadecenyl succinic anhydride (36 g) was melted at 75° C. for 1–2 hours before dissolving in tetrahydrofuran (100 ml). When the temperature of the soy dispersion reached 50° C., the ODSA/THF solution was added in 5 ml increments over 1 hour with concurrent adjustment of pH to 8.5 with 1 N NaOH. The solution was stirred for an additional hour to hydrolyze any unreacted anhydride. Protein was recovered by precipitation at pH 4.0 with 1 N HCl. The precipitate was washed and filtered three times with deionized water. The protein was dried at 60° C. and finely ground.

EXAMPLE 4

Modified Soy Protein Film Made by Casting

Soy protein modified with OSA and DDSA, in accordance with Examples 1 and 2 above, was made into films. The acylated protein (5% w/v) was dispersed with either 3% or 1% glycerin (w/v) in a 1:1.33 solution of deionized water: 6N $NH_4OH$. The solution was stirred at 80° C. on a magnetic stir plate for 30 minutes. After 15 minutes, 10 ml of 6N $NH_4OH$ is added to readjust the pH. After 30 minutes, film solutions were filtered through 4 layers of cheesecloth to remove undissolved particles and cast onto Teflon-coated glass plates. Film thickness was controlled by casting a known amount of film solution poured onto bound areas on the plates. Plates were previously leveled to the nearest 13 $\mu$m. Films were allowed to dry at ambient conditions for 15 hours.

EXAMPLE 5

Modified Soy Protein Film Made by Compression Molding

Soy protein modified with ODSA, in accordance with Example 3 above, was insoluble in solvents available for edible film formation. A film was made by heating the soy granules under pressure with a Carver Model C Laboratory Press (Fred S. Carver, Menomonee Falls, Wis.). No glycerol was added. Films were pressed at 115° C. under an applied load of 562.5 kg. The temperature was held for 15 minutes, then the assembly was allowed to cool. When the plates approached room temperature (approximately 1 hour), the pressure was released. The thinnest film that could be made was 152.4 $\mu$m as a 5.08 cm circle.

EXAMPLE 6

Properties of Modified Soy Proteins and Their Films

Isolated soy protein modified with alkenyl succinic anhydrides, in accordance with Examples 1, 2 and 3 above, were analyzed by thermal gravimetric analysis (TGA) and differential scanning calorimetry (DSC). The TGA was performed to determine the decomposition temperature with a Dupont Instruments Model 951 Thermal Gravimetric Analyzer (TA Instruments, Inc., New Castle, Del.). Data were analyzed with TA Instruments 2100 Thermal Analysis software (TA Instruments, Inc., New Castle, Del.). Ten milligrams of sample was placed in a platinum sample pan. The assembly was purged with nitrogen for 10 minutes, then temperature was taken from room temperature to 350° C. at 10° C./min. Results are shown in FIG. 1. Modification of ISP with alkenyl succinic anhydrides lowers the decomposition temperature. Eighty percent of the starting weight is lost at 230° C., for DDSA and OSA, 280° C. and 300° C. ODSA and ISP, respectively. Thermal gravimetric analysis also shows that there is more water evaporation from the ISP film than the modified ISP films. Approximately 95% of the starting weight is lost at 100° C. for ISP films, while only 97.5–98% of the starting weight is lost for the modified films at this temperature. This indicates that the alkenyl succinic anhydride-modified films have less affinity for water uptake.

Figure 2:
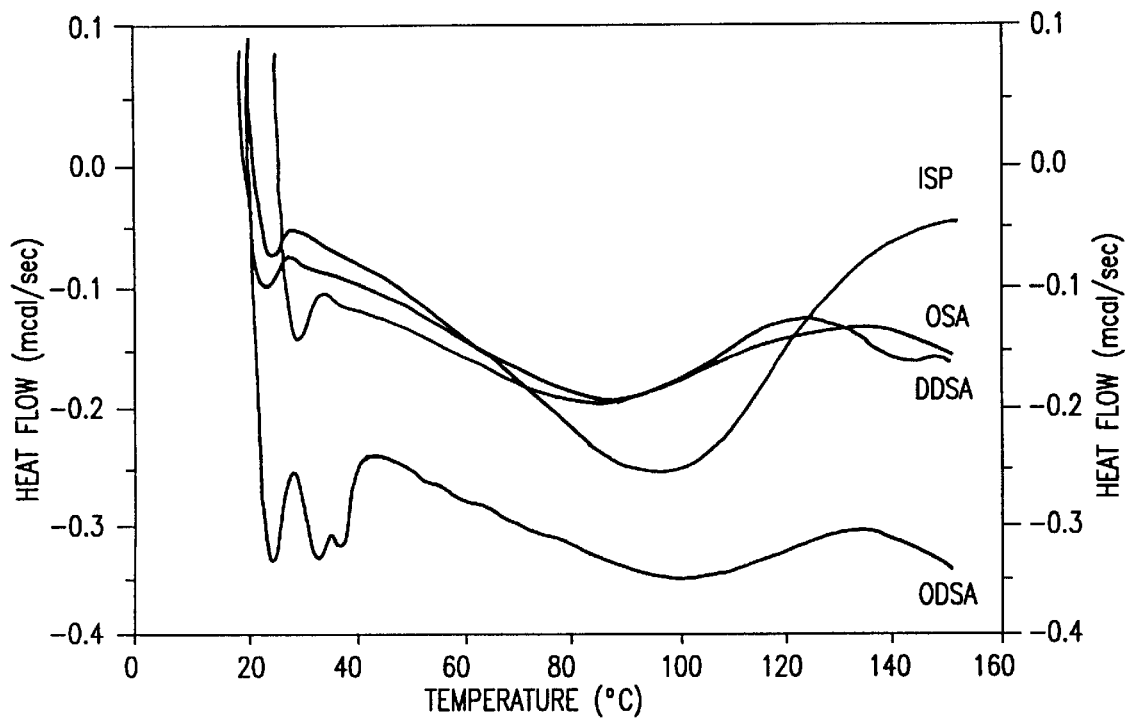
FIG. 2 is a diagrammatic representation of a differential scanning calorimetry curve for isolated soy protein and alkenyl succinic anhydride modified isolated soy protein films.

Differential scanning calorimetry was performed with a Dupont Instruments Model 901 cell base DSC. Data were analyzed with TA Instruments 2100 Thermal Analysis software (TA Instruments, Inc., New Castle, Del.). Films were placed in aluminum sample pans, sealed, and positioned in the cell base. A nitrogen purge was run for 10 min. Temperature was raised from room temperature to 150° C. at a rate of 10° C./min. The sample was then cooled and reheated to observe if crystallinity would occur. TGA and DSC are complementary methods which aid in determining the cause of a thermal transition, whether it is due to decomposition, dehydration, or a polymer chain movement. As is shown in FIG. 2, DSC analysis revealed an endothermic peak around 95° C. for ISP. For OSA and DDSA, this peak has shifted toward 80° C. and has become broader. For ODSA the peak is shifted toward 100° C. and shows an increase in breadth. This endotherm is most likely due to water evaporation. The observed decrease in energy requirement of such process between ISP and modified ISP films may be due to the fact that the modified films contain less protein and more hydrocarbon than ISP films. They may have less absorbed water to evaporate, hence less energy requirements. This data corresponds with the TGA data described above. DDSA modified ISP films have a slight endotherm at 140° C. corresponding to the boiling point of DDSA, 150° C. The boiling point of OSA is 180° C. and this endotherm is not observed since samples were only heated to 150° C. ODSA has a double endotherm between 30–40° C., most likely due to melting of the hydrocarbon moiety. The thermogram for ODSA modified ISP film is located below the other thermograms because it is much thicker and requires more energy.

Attenuated total reflectance infrared spectroscopy (ATR) was also performed. Spectra were obtained with a Bio-Rad Digilab FTS-45 Fourier Transform Infrared Spectrophotometer (Bio-Rad Laboratories, Cambridge, Mass.) equipped with a mercury-cadmium-telluride detector and a Wilmad Model 9 vertical reflectance system (Wilmad Glass Co., Inc., Buena, N.J.). A KRS-5 crystal was positioned along with the sample in an internal reflecting plate set at a 45° angle. Sixteen scans were collected at a resolution of 8 $cm^{-1}$.

Film properties of alkenyl succinic anhydride modified ISP films are shown in Tables 1–4. Water vapor permeability was evaluated using a modified ASTM Standard Method E 96-80 with a 47% relative humidity gradient and at 25° C. Films were placed in the test cups that contained water and the assembly was placed in an environmental chamber kept at 53% relative humidity. As discussed above, thinner films result in lowered water vapor permeability. In order to see the effect of thickness on the water vapor permeability of modified ISP films, they were produced at 51 and 25 $\mu$m. It should be noted that the water vapor permeability, which is theoretically independent of thickness, approximately doubles in value when the thickness of the film is doubled, for hydrophilic films. For modified ISP films the spread is even greater. Table 1 shows the WVP data. It should also be noted that these films are made with 1% glycerol as the plasticizer. Such films are not practical with unmodified ISP. Unmodified ISP films require 3% glycerol to retain mechanical integrity during use. Unmodified ISP films made with 3% glycerol at 51 $\mu$m have an even higher WVP of $4.18 \times 10^5$ g·25 $\mu m^2$·day·atm.

TABLE 1

Water Vapor Permeability of Alkenyl Succinic Anhydride Modified Soy Protein Films[1]

| Treatment | Water Vapor Permeability ($\times 10^5$ g 25 $\mu$m/m$^2$dayatm) | |
|---|---|---|
| | 51 $\mu$m thick | 25 $\mu$m thick |
| None | 3.70$^a$ | 1.84$^d$ |
| OSA | 3.50$^a$ | 1.08$^e$ |
| DDSA | 2.66$^b$ | 0.69$^f$ |
| ODSA | 0.13$^c$ | 0.13$^f$ |

[1]Mean values having the same superscript are not significantly different (p < 0.05). This only applies within columns, not between columns.

Modified ISP films were tested as to whether the hydrophobic carbon chains oriented toward the air during drying of the film solution. Films were placed in the water vapor permeability test cups with the side of the film exposed to the air during drying either up or down. There were no significant differences in water vapor permeability values.

Oxygen permeability was evaluated according to the ASTM Standard Method D 3985-81 with an OX-TRAN 1000 (Mocon Inc., Minneapolis, Minn.). They were tested at 0% relative humidity and at 25° C. The results are set forth in Table 2.

TABLE 2

Oxygen Permeability of Alkenyl Succinic Anhydride Modified Soy Protein Films[1]

| Treatment | Oxygen Permeability (cc25 $\mu$m/m$^2$dayatm) 51 $\mu$m thick |
|---|---|
| None | 11.09$^a$ |
| OSA | 60.56$^a$ |
| DDSA | 556.14$^b$ |

[1]Mean values having the same superscript are not significantly different (p < 0.05).

The oxygen permeability of unmodified ISP films made at 3% glycerol at 51 $\mu$m is 4.10cc·25 $\mu$m/m$^2$·day·atm. This is a lower value than observed with the acylated films, however, OSA-modified ISP films can still be classed as barrier films.

Tensile strength and percent elongation were measured according to ASTM Standard Method E 882-88. Films were conditioned prior to testing at 53% and at 25°. Results are shown in Tables 3 and 4.

TABLE 3

Tensile Strength of Alkenyl Succinic Anhydride Modified Soy Protein Films[1]

| Treatment | Tensile Strength (MPa) | |
|---|---|---|
| | 51 $\mu$m thick | 25 $\mu$m thick |
| None | 24.89$^a$ | 26.14$^c$ |
| OSA | 9.31$^b$ | 5.83$^d$ |
| DDSA | 6.08$^b$ | 6.68$^d$ |

[1]Mean values having the same superscript are not significantly different (p < 0.05). This only applies within columns, not between columns.

TABLE 4

Elongation of Alkenyl Succinic Anhydride Modified Soy Protein Films[1]

| Treatment | Elongation (%) | |
|---|---|---|
| | 51 $\mu$m thick | 25 $\mu$m thick |
| None | 13.52$^a$ | 5.31$^c$ |
| OSA | 42.63$^a$ | 16.70$^d$ |
| DDSA | 81.82$^b$ | 4.48$^c$ |

[1]Mean values having the same superscript are not significantly different (p < 0.05). This only applies within columns, not between columns.

The tensile strength of ISP films made with 3% glycerol is 4.88 MPa and the elongation of ISP films made with 3% glycerol is 95.38%. Thus, while there is a decrease in the tensile strength due to acylation, the films are much stronger than the standard films, so, in effect, the tensile strength increases over the previously available films. The elongation values improve with acylation, but they are not as high as unmodified films made with 3% glycerol.

Because of the vast improvements in the water vapor permeability and water solubility properties of alkenyl succinic anhydride-modified ISP films while retaining mechanical integrity, and their thermoplastic property, their use should not be limited exclusively to foods. Other end uses include pharmaceutical, biomedical, and packaging applications.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A modified soy protein composition comprising soy protein having substituted acylamido groups, the substituent comprising a carbon chain substituent selected from the group consisting of alkyl and alkenyl groups, said carbon chain substituent comprising at least eight carbon atoms per chain.

2. The composition set forth in claim 1 further including soy protein having substituted acylimido groups.

3. The composition set forth in claim 1 further including soy protein having substituted acyloxy groups.

4. The composition set forth in claim 1 wherein said acylamido groups are substituted with a carboxy-bearing carbon chain substituent.

5. The composition set forth in claim 1 wherein the acylamido groups are derived from succinic anhydride.

6. A method for modifying soy protein comprising the steps of:
   providing an aqueous solution of soy protein; and
   acylating the soy protein with a cyclic anhydride having a carbon chain substituent selected from the group consisting of alkyl and alkenyl groups, said carbon chain substituent comprising at least eight carbon atoms per chain.

7. The method set forth in claim 6 wherein the cyclic anhydride is glutaric anhydride.

8. The method set forth in claim 6 wherein the cyclic anhydride is succinic anhydride.

9. The method set forth in claim 6 wherein the aqueous solution of soy protein is adjusted to a pH of greater than about 7 prior to reaction with the cyclic anhydride.

10. The method set forth in claim 6 including the further step of precipitating the acylated soy protein with an acid.

11. A thermoplastic article comprising modified soy protein comprising soy protein having substituted acylamido, acylimido and acyloxy groups, wherein said substituted groups are substituted with a long chain carbon group, said long chain carbon group having a sufficient number of carbon atoms to render the modified soy protein thermally processable and water insoluble.

12. An article as set forth in claim 11 wherein said substituted acylamido group is substituted with a carboxy-bearing long chain carbon group.

13. An article as set forth in claim 11 wherein the thermoplastic article is a film.

14. An article as set forth in claim 11 wherein the thermoplastic article is a molded article.

15. An article as set forth in claim 11 wherein the thermoplastic article is a coating.

* * * * *